Patented Mar. 21, 1939

2,151,380

UNITED STATES PATENT OFFICE 2,151,380

AMIDES OF ACIDS OF PHOSPHORUS

Robert B. Flint and Paul L. Salzberg, Wilmington, Del., assignors to E. I. du Pont de Nemours & Company, Wilmington, Del., a corporation of Delaware No Drawing. Application March 1, 1937,
Serial No. 128,494

14 Claims. (Cl. 260—461)

This invention relates to amides and more particularly to phosphonamides wherein an amido hydrogen is replaced by an alkyl radical of at least ten carbon atoms.

This invention has as an object the preparation of new organic amides of acids of phosphorus. A further object is the preparation of lubricant components. A still further object is the preparation of paint components. Other objects will appear hereinafter.

These objects are accomplished by the following invention wherein a monoamine having, attached to the amino nitrogen atom, a hydrogen atom and a hydrocarbon radical of at least ten carbon atoms, or a hydrohalide of such amine, is reacted with a halide or an aromatic ester of an acid of phosphorus. In the case of the halide, the product of the reaction may optionally be reacted further with an alkali metal hydroxide, alcoholate or phenolate. In all cases, there is obtained a phosphorus acid amide having a long chain alkyl radical attached to amido nitrogen and, depending on conditions and reactants, one or two ester or free acid groups. The products are useful as paint and lubricant ingredients.

The purposes and general description of the invention outlined above are further illustrated in the following examples which are not intended to be limitative. Parts are by weight unless otherwise stated.

EXAMPLE I

N-dodecyldiethylphosphonamide

In a glass-lined reaction vessel were placed 46.2 parts of phosphorus oxychloride and 22.2 parts of n-dodecylamine hydrochloride and this mixture was heated under gentle reflux for 15 hours. At the end of this time the liberation of hydrogen chloride had ceased. The reaction mixture was cooled and added to a solution prepared from 18 parts of metallic sodium and 300 parts of absolute ethyl alcohol (a solution of sodium ethylate or ethoxide according to Norris-Organic Chemistry, page 84). A vigorous reaction occurred, at the end of which the mixture was slightly acidic. The salt that formed was filtered off, and the filtrate evaporated to dryness on a steam bath. The residue was taken up in benzene, washed with water, dried over anhydrous sodium sulfate, the benzene distilled, and the residue fractionated. The N-dodecyldiethylphosphonamide, an oily liquid, boiled at 180–190° C. at 5 mm. On elementary analysis, it was found to contain 10.1% phosphorus as compared to the calculated amount of 9.66%. It may be ascribed the formula

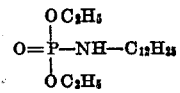

EXAMPLE II

N-dodecylphosphonamide

When a mixture of equimolar amounts of phosphorus oxychloride and n-dodecylamine is cooled and added to an excess of dilute aqueous sodium hydroxide (about 6%), N-dodecylphosphonamide, a compound of the formula

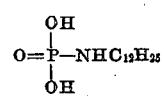

is obtained.

Examples I and II are examples of the reaction of halides of orthophosphoric acid with monoamines having, on the amino nitrogen, a hydrogen atom and an open chain hydrocarbon radical of at least ten carbon atoms and the reaction of the resultant product with a compound of the formula ROM where M is an alkali metal and R is chosen from the class consisting of hydrogen and hydrocarbon radicals, to form products of the formula

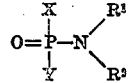

discussed more thoroughly below. Among the values of X and Y are hydroxyl, aryloxy and alkoxy. These are supplied by the RO radical of the ROM compound used in the second step of the processes exemplified in Examples I and II.

EXAMPLE III

Phenyl- and diphenyl-N-dodecylphosphonamides

In a reaction vessel were placed 18.5 parts of n-dodecylamine, 32.6 parts of triphenyl phosphate, and 0.4 part of litharge. The vessel was set up for distillation and heated in a Woods metal bath to 270–280° C. The distillation at atmospheric pressure was continued as long as any material distilled over. High vacuum was then applied to the system and the distillation continued to remove the last traces of phenol and unreacted dodecylamine. The residue in the flask was diluted with alcohol, mixed with kieselguhr and filtered. The light orange filtrate was evaporated on a steam bath. There was obtained 25.5 parts of a light brown viscous oil soluble in the common organic solvents and in lubricating oils. This product was a mixture of phenyl-N-dodecyl-phosphonamides, principally those of the formulas

and

A mixture of cresyl- and dicresyl-N-dodecyl-phosphonamides may be obtained by replacing the triphenyl phosphate of the above example with tricresyl phosphate. The product has properties similar to those of the product of Example III.

EXAMPLE IV

N,N',N''-tri-n-dodecylphosphontriamide

In a reaction vessel equipped with a reflux condenser and a mechanical stirrer, were placed 15.4 parts of phosphorus oxychloride and 50 parts of dry diethyl ether. The reaction mixture was cooled externally by ice, and a solution of 111 parts of n-dodecylamine in 200 parts of dry ether was then slowly added. After all the dodecylamine had been added, the reaction mixture was heated under reflux for 4.5 hours. Water was added to the reaction mixture and the aqueous layer separated. On evaporation of the remaining ether layer, an oil was obtained which solidified on cooling to a yellowish waxy solid. This material, after being recrystallized twice from ethyl alcohol, melted at about 75° C. On analysis, it was found to have a phosphorus content of 5.42% as compared to the calculated value of 5.17% for N,N',N''-tri-n-dodecylphosphontriamide, which has the formula

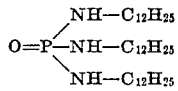

EXAMPLE V

N,N',N''-tri-n-dodecyltriamide of phosphorous acid

In a reaction vessel equipped with a reflux condenser, means for agitation and means for gradual addition of liquid was placed 10 parts of phosphorus trichloride dissolved in 50 parts of petroleum ether. The vessel was then cooled externally in an ice bath, and to the cold mixture was added 84 parts of n-dodecylamine dissolved in 200 parts of ligroin at such a rate as to maintain gentle refluxing. After all the amine had been added, the reaction mixture was heated under reflux for 4.5 hours, the solid which formed during this period then being removed by filtration while the mixture was still hot. When the filtrate was cooled, a white crystalline product separated. This product was purified by recrystallization from ethyl alcohol, whereby a 43% yield of a wax-like solid, soluble in organic solvents, was obtained. On analysis its nitrogen content was found to approximate the calculated value for the N,N',N''-tri-n-dodecylamide of phosphorous acid, the compound having the formula $P(NHC_{12}H_{25})_3$.

While the present invention is generic to and comprehends broadly the amides of phosphorus acids in which at least one amido hydrogen is replaced by an open-chain hydrocarbon radical of at least ten carbon atoms, the compounds forming the preferred embodiment of the invention are the long chain amides of o-phosphoric acid. They have the generic formula

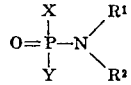

in which $R^1$ is hydrogen or a hydrocarbon radical, $R^2$ is an open-chain hydrocarbon radical of at least ten carbons, and X and Y are hydroxyl, aryloxy, alkoxy, or

groups. $R^1$, for example, may be methyl, butyl, allyl, hexyl, phenyl, benzyl, cyclohexyl, naphthyl, and the like. $R^2$ for example, may be decyl, undecyl, dodecyl, tridecyl, tetradecyl, pentadecyl, hexadecyl, 9,10-octadecenyl, octadecyl, eicosyl, eleostearyl, or the mixture of long chain alkyl radicals corresponding to the long chain alcohols of at least ten carbon atoms obtained by the hydrogenation of naturally occurring fats or oils, for example, palm oil, coconut oil, olive oil, stearin, etc.

In the preparation of these phosphorus acid amides the appropriate amine and amide-forming derivative of the phosphorus acid (i. e. the acid halide or an aromatic ester) are used. Monoamines (or hydrohalides thereof) having, attached to the amino nitrogen, at least one hydrogen atom and an open chain hydrocarbon radical of at least ten carbon atoms, are of generic utility. Thus there may be employed decylamine, cetylamine, octadecylamine, ricinoleylamine, n-dodecylmethylamine, didodecylamine, n-cetylisobutylamine, tetradecylamine, eicosylamine, undecylamine, undecenylamine, 2-aminododecane, 10-aminoeicosane, N-ethyl-3-aminooctadecane, and n-hexyltetradecylamine, and their hydrochlorides, hydrobromides and hydroiodides.

Among the amide-forming derivatives of the acids of phorphorus that may be used in the invention are the following: phosphorus trichloride, bromide, and iodide; phosphorus oxychloride; and aryl phosphates and phosphites, e. g., mono-, di-, and triphenyl phosphites and phosphates, as well as the corresponding cresyl and naphthyl esters. Esters of phosphorus acids with alcohols are not suitable.

The temperatures to be used in the process will depend upon the reactants. If a phosphorus acid halide is used, the temperature should be from 0 to 200° C., and when the aromatic ester is employed, the temperature should be above 200° C. and preferably in the range 250°–300° C. The temperature necessary for reaction will also depend to some extent on whether the amine hydrohalide or the free amine is being used, the reaction as a rule proceeding at a lower temperature with the free amine.

With esters, an alcoholysis or ester-interchange catalyst, e. g., litharge, alkalies, and alkali metal alcoholates, is preferred.

The reaction is preferably carried out in solution in an inert organic solvent, i. e., one which is chemically non-reactive under the conditions of the process with both the reactants and reaction products. Suitable inert solvents include ethers, hydrocarbons, and chlorinated aromatic hydrocarbons, suitable specific compounds being benzene, toluene, ligroin, diethyl ether, dibutyl ether, dioxane, and chlorobenzene.

As typical examples of amides of the present invention, in addition to those described in the examples, the following may be mentioned: dimethyl - N - octadecylphosphonamide, isobutyl-N,N'-dicetylphosphondiamide, N,N',N''-tri-n-decylphosphontriamide, and dipropyl-N-octadecenyl-phosphonamide.

A phosphonamide having on the amido nitrogen a long chain of at least ten carbon atoms is an oil-like substance having, because of the long alkyl chain, a greatly enhanced solubility in hydrocarbons, oils, and organic solvents generally as compared to lower N-alkylphosphonamides. This greater solubility, especially in lubricating and drying oils, makes these products more useful as modifying agents for lubricating oils and as rust inhibitors for paints than the lower N-alkylphosphonamides.

The long chain phosphonamides of this invention are, as already indicated, useful as anticorrosive agents in paints and extreme pressure lubricant assistants in lubricating oils and greases. They are also useful as plasticizers for various cellulose derivatives and as a toxic ingredient of bactericidal and insecticidal compositions.

The above description and examples are intended to be illustrative only. Any modification of or variation therefrom which conforms to the spirit of the invention is intended to be included within the scope of the claims.

We claim:

1. An amide of a phosphorus acid wherein one hydroxyl of a phosphorus acid is replaced by a radical of the formula NR'R wherein R is an open chain hydrocarbon radical of at least ten carbon atoms and R' is one of the group consisting of hydrogen and alkyl radicals.

2. An amide of o-phosphoric acid wherein one hydroxyl of the o-phosphoric acid is replaced by a radical of the formula —NR'R wherein R is an open chain hydrocarbon radical of at least ten carbon atoms and R' is one of the group consisting of hydrogen and alkyl radicals.

3. An amide of phosphorous acid according to claim 1.

4. An amide of a phosphorous acid according to claim 1 further characterized in that another hydroxyl of the phosphorous acid is esterified with a lower aliphatic monohydric alcohol.

5. An amide of ortho-phosphoric acid wherein a hydroxyl group of the ortho-phosphoric acid is replaced by a dodecylamino group.

6. An amide of ortho-phosphoric acid wherein a hydroxyl group of the ortho-phosphoric acid is replaced by a dodecylamino group and a further hydroxyl group is esterified with a lower aliphatic monohydric alcohol.

7. Process which comprises reacting a member of the class consisting of halides and aromatic esters of phosphorous acids with a monoamine of the formula R—NH—R', wherein R is an open chain alkyl radical of at least ten carbon atoms and R' is one of the group consisting of hydrogen and alkyl radicals.

8. Process which comprises reacting a member of the class consisting of halides and aromatic esters of o-phosphoric acid with a monoamine of the formula R—NH—R', wherein R is an open chain alkyl radical of at least ten carbon atoms and R' is one of the group consisting of hydrogen and alkyl radicals.

9. Process which comprises reacting an aromatic ester of orthophosphoric acid with a monoamine of the formula R—NH—R', wherein R is an open chain alkyl radical of at least ten carbon atoms and R' is one of the group consisting of hydrogen and alkyl radicals.

10. Process which comprises reacting a halide of orthophosphoric acid with a monoamine of the formula R—NH—R', wherein R is an open chain alkyl radical of at least ten carbon atoms and R' is one of the group consisting of hydrogen and alkyl radicals.

11. Process which comprises reacting a halide of orthophosphoric acid with a monoamine of the formula R—NH—R', wherein R is an open chain alkyl radical of at least ten carbon atoms and R' is one of the group consisting of hydrogen and alkyl radicals, and reacting the resultant product with a compound of the formula R''OM where M is an alkali metal and R'' is chosen from the class consisting of hydrogen and open chain lower alkyl radicals.

12. Process which comprises reacting phosphorous oxychloride with a primary open chain monoamine having at least ten carbon atoms, and reacting the resulting product with a compound of the formula R''OM, where M is an alkali metal and R'' is an open chain lower alkyl radical.

13. An amide of a phosphorous acid wherein one hydroxyl of a phosphorous acid is replaced by a radical of the formula —NR'R, wherein R is an open chain alkyl radical of at least ten carbon atoms and R' is one of the group consisting of hydrogen and alkyl radicals.

14. An amide of o-phosphoric acid wherein one hydroxyl of the o-phosphoric acid is replaced by a radical of the formula —NR'R, wherein R is an open chain alkyl radical of at least ten carbon atoms and R' is one of the group consisting of hydrogen and alkyl radicals.

PAUL L. SALZBERG.
ROBERT B. FLINT.

CERTIFICATE OF CORRECTION.

Patent No. 2,151,380. March 21, 1939.

ROBERT B. FLINT, ET AL.

It is hereby certified that error appears in the printed specification of the above numbered patent requiring correction as follows: Page 3, first column, line 32, claim 1, for "NR'R" read -NR'R; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.